United States Patent
Quickert et al.

(10) Patent No.: US 12,552,434 B2
(45) Date of Patent: Feb. 17, 2026

(54) METHOD FOR DEALING WITH OBSTACLES IN AN INDUSTRIAL TRUCK DURING DRIVING OPERATION THEREOF

(71) Applicant: Jungheinrich Aktiengesellschaft, Hamburg (DE)

(72) Inventors: Steffen Quickert, Wildeshausen (DE); Tony Altmann, Brokstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 18/777,284

(22) Filed: Jul. 18, 2024

(65) Prior Publication Data
US 2025/0026394 A1 Jan. 23, 2025

(30) Foreign Application Priority Data
Jul. 19, 2023 (EP) .................................. 23186397

(51) Int. Cl.
*B62B 5/00* (2006.01)
*B62B 3/06* (2006.01)
*B62B 5/04* (2006.01)

(52) U.S. Cl.
CPC .......... *B62B 5/0006* (2013.01); *B62B 3/0612* (2013.01); *B62B 5/0404* (2013.01)

(58) Field of Classification Search
None
See application file for complete search history.

(56) References Cited

U.S. PATENT DOCUMENTS

| | | | |
|---|---|---|---|
| 2017/0372150 A1* | 12/2017 | Mayser | G06T 7/13 |
| 2018/0059682 A1* | 3/2018 | Thode | B62D 53/005 |
| 2019/0299982 A1* | 10/2019 | Guechai | B60W 10/20 |
| 2020/0327341 A1 | 10/2020 | Minami et al. | |
| 2021/0081684 A1* | 3/2021 | Yamamoto | B62D 15/0275 |
| 2021/0271245 A1* | 9/2021 | Bradley | G05D 1/227 |
| 2022/0111838 A1* | 4/2022 | Cho | B60W 10/18 |
| 2022/0289538 A1 | 9/2022 | Kawashima et al. | |

FOREIGN PATENT DOCUMENTS

| | | |
|---|---|---|
| EP | 3495314 A1 | 6/2019 |
| EP | 3792720 A1 | 3/2021 |
| EP | 4180380 A1 | 5/2023 |

OTHER PUBLICATIONS

European Application No. 23186397.8, Extended European Search Report mailed Jan. 8, 2024, 2 pages.

* cited by examiner

*Primary Examiner* — Peter D Nolan
*Assistant Examiner* — Jacob Kent Besteman-Street
(74) *Attorney, Agent, or Firm* — Kilpatrick Townsend & Stockton LLP

(57) ABSTRACT

A method and system for dealing with obstacles in an industrial truck during a driving operation. The surroundings of the industrial truck are detected on at least one side perpendicular to the locomotion direction using at least one sensor unit. A traveled path is detected using a routing unit. When an object is detected, its lateral distance and position relative to the path are stored. A respective admissible maximum steering angle to the stored objects is determined based on the stored lateral distances and a predetermined movement model of the industrial truck. The smallest steering angles is selected as a critical steering angle. The critical steering angle is compared with a current steering angle, and if the current steering angle is larger than the critical steering angle, a predetermined measure is triggered.

16 Claims, 3 Drawing Sheets

METHOD FOR DEALING WITH OBSTACLES IN AN INDUSTRIAL TRUCK DURING DRIVING OPERATION THEREOF

CROSS REFERENCE TO RELATED APPLICATION

This application claims priority to European Patent Application No. 23186397.8, filed in Europe on Jul. 19, 2023, the entire contents of which are hereby incorporated herein by this reference.

BRIEF DESCRIPTION OF THE DRAWINGS

Various embodiments in accordance with the present disclosure will be described with reference to the drawings, in which.

DETAILED DESCRIPTION

Figure 1A:
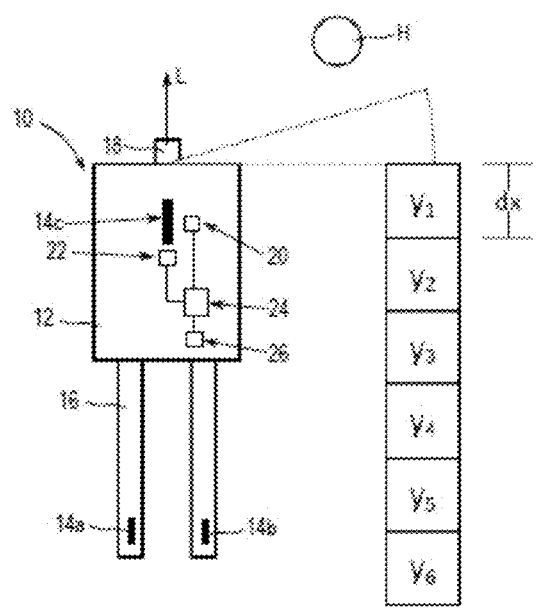
FIGS. 1A and 1B show a schematic view of an industrial truck during a driving operation, according to some embodiments.

The present invention relates to a method for dealing with obstacles in an industrial truck during a driving operation thereof as well as an industrial truck which is configured to perform such a method during its driving operation.

It is desirable in particular in person-guided industrial trucks, in order to assist a respective operator and to avoid collisions with obstacles, to perform a detection of the surroundings of the corresponding industrial truck with sensor units suitable for this purpose and in the event of a risk of a collision with an obstacle identified in the manner to issue a warning to the operator and/or immediately intervene in the control of the industrial truck, to initiate, for example, an evasive manoeuvre or a braking process thereof.

For this purpose, current systems for warning about objects in industrial trucks generally operate with forecasts of the route thereof on the basis of a current or an assumed maximum speed. Moreover, a complex so-called "Occupancy Grid Mapping" algorithm is usually used for the calculation of a blind spot which can be present at specific points in time of the locomotion of the industrial truck relative to corresponding sensor units, by means of which algorithm the positions of obstacles in the surroundings of the industrial truck are recorded and stored and the risk of a collision with an obstacle can be identified by a comparison with a route, assumed for the future, of the industrial truck.

It has, however, been shown in this case the previously known systems and methods only trigger during travel of the corresponding industrial truck and/or with an excessive rate of false positive identifications of potential risk situations, which can be annoying or irritating for an operator of the corresponding industrial truck and can reduce the operational efficiency of the industrial truck. Alternatively, the previously used systems require a relatively high level of resources as a result of the complex calculation of occupancy maps of the surroundings of the corresponding industrial truck as well as potential collisions with obstacles or costly sensor-based all-round monitoring of the industrial truck.

The object of the present invention is consequently to provide a simple method for dealing with obstacles in an industrial truck during a driving operation thereof, in the case of which complex sensors can as far as possible be dispensed with and which initially enables a steering angle-dependent generation of a warning system which offers protection from a collision thereof with laterally located obstacles and in this case on one hand reduces false positive identification of potential risk situations and collisions to a minimum, while on the other hand a significantly reduced use of resources is achieved in the calculation of potential risk situations. In particular, a predetermined measure, such as, for example, a warning for the operator of the industrial truck, should be triggered precisely when a steering angle is adopted which could potentially lead to a collision with an object at the side of the industrial truck. For this purpose, in particular objects in the blind spot of corresponding sensor units should be taken into account and as low as possible use of resources in terms of calculation outlay should be achieved.

In order to achieve this object, the method according to the invention comprises the steps, during a locomotion of the industrial truck along a locomotion direction, of detecting the surroundings of the industrial truck on at least one side perpendicular to the locomotion direction by means of at least one sensor unit which is configured to determine objects and respective distances thereof to the industrial truck, detecting a traveled path by means of a routing unit, and in the case of a determination of a presence of an object, storing the lateral distance of the object in a storage unit and at least one piece of information about the position or a position region of the object relative to the traveled path of the industrial truck, wherein the storage is performed in particular for a region, not detected by the sensor unit, of the surroundings of the industrial truck, determining a respective admissible maximum steering angle to at least a part of the determined objects on the basis of the stored distances and a predetermined movement model of the industrial truck, selecting the smallest of the admissible maximum steering angles as a critical steering angle, and comparing the critical steering angle with a current steering angle of the industrial truck which is determined by means of a steering angle sensor, wherein, if the current steering angle of the industrial truck is larger than the critical steering angle, at least one predetermined measure is triggered.

Consequently, in the method according to the invention, only a small sector to the right and/or left of the vehicle is considered at any time and if an obstacle arises in this sector, the distance to this obstacle is stored in the storage unit. It is of course conceivable in this case to also perform the corresponding detection obliquely in front of the vehicle and in a suitable manner derive the position of an identified obstacle correspondingly in terms of its distance perpendicular to the vehicle relative to the locomotion direction. The detection of the surroundings of the industrial truck on a side perpendicular to the locomotion direction should correspondingly be understood such that a region is detected which is not directly driven over by the vehicle, rather is located to the side of the region covered by the vehicle. In other words, objects in the detection region of the sensor unit are therefore detected and for these the lateral distance to the vehicle and additionally information about a position or a position region of the object relative to the path traveled by the industrial truck are identified, so that, during the movement of the industrial truck, if the detected objects move into the blind spot of the sensor, their position relative to the current location of the industrial truck is stored and can be taken into account when assessing the movement of the industrial truck in terms of potential collisions.

The method feature that an admissible maximum steering angle to at least a part of the determined objects should be determined should be understood in such a manner that, under certain circumstances, it can also be identified that individual objects of the determined objects are not relevant for the further process. Such a case can arise, for example, if two objects located substantially consecutively in relation to the lateral distance are detected and consequently only that closest to the vehicle should be taken into account for an identification of a corresponding admissible steering angle. In such cases, the objects classified as irrelevant could already be rejected at an early point in time of the method in order to further increase procedural efficiency.

In this manner, it is therefore enabled in a simple and resource-saving manner to determine an admissible maximum steering angle for each of the determined objects on the basis of the stored distances, wherein subsequently a critical steering angle can be derived from all the admissible maximum steering angles identified in this manner and compared with a current steering angle of the industrial truck in order to be able to detect potential risk situations of the industrial truck at an early stage and initiate corresponding countermeasures.

In particular, in this case, the surroundings of the industrial truck on at least one side of the industrial truck, in particular on both sides, can be divided into a plurality of portions of a predetermined length relative to the path traveled as a position region, for which in each case the presence of an object and the corresponding distance or an absence of an object can be determined and, where applicable, stored. The corresponding portions thus serve as the smallest units in which an obstacle can be present and can be detected, wherein, as a result of such a division of the surroundings into linearly consecutive portions, a significant reduction in the necessary storage and calculation requirements and in general a simplification of the fundamental model of the surroundings can be achieved.

As already indicated further above in a general from, in the event of a determination of a presence of several objects within a single portion, in the concrete case which has just been introduced, only the distance from the closest object in relation to the industrial truck can be stored, since only this closest object is regarded as critical for the method.

Alternatively or additionally, as soon as the path traveled relative to a specific object exceeds a length of the industrial truck, this object can be deleted from the storage unit. In this manner, the storage unit acts as a buffer in which only information about objects which are still located in the region of the industrial truck relative to the direction of travel is retained, while data from the past about objects which have already been passed can be immediately deleted. As a result of this measure, a significant reduction in the necessary storage and calculation requirement is achieved since in particular in the event of a division of the surroundings of the industrial truck into a multiplicity of portions in the described manner, the respective number of portions together with an assigned distance of a potentially present object or a value which represents an absence of an object only have to be stored, retained and taken into account when determining the respective admissible maximum steering angle for each corresponding side of the vehicle.

It can furthermore additionally be provided in this case that, in the event of a reversal of the direction of movement of the vehicle, in a similar manner the objects now located behind the vehicle can equally be deleted from the storage unit if the path traveled in the opposite direction in relation to these objects likewise exceeds a length of the industrial truck or they are no longer present in the longitudinal region of the industrial truck.

As a further measure to avoid false positive triggering processes of the at least one predetermined measure or to reduce the outlay in identifying potential collision events, it can be provided to perform a filtering of the specific objects on the basis of geometrical properties of the industrial truck. In particular, for this filtering, a quarter circle can be constructed on the corresponding side of the industrial truck, wherein the center point of the quarter circle is determined by a point of intersection of an outer edge of the industrial truck and a perpendicular projection to a point of rotation of the industrial truck and a distance from this center point to a front external point of the industrial truck serves as the radius. Only objects consequently detected within this radius can be assumed to be valid or having to be taken into account.

Moreover, a single-track model can be used as the predetermined movement model of the industrial truck, wherein, irrespective of the movement model used, an admissible maximum steering angle can be determined for a specific object in each case in such a manner that the correspondingly calculated route of the industrial truck for the future, independently of the current speed of the industrial truck, no longer overlaps the corresponding object in a plan view.

As already indicated further above, the triggering of the at least one predetermined measure can comprise notifying an operator of the industrial truck by means of a corresponding notification unit and/or a control and/or brake intervention of the industrial truck. In this manner, a collision with one of the ascertained objects can correspondingly be counteracted in a suitable manner by a manual intervention which follows the notification or an automated intervention in the control unit or braking device of the industrial truck.

According to a second aspect, the present invention relates to an industrial truck, comprising a vehicle body with at least three wheels provided thereon, a load handling device, at least one sensor unit which is configured to determine objects and respective distances thereof to the industrial truck in a direction perpendicular to a main locomotion direction, a routing unit, a steering angle sensor, and a control unit which is operationally coupled to the at least one sensor unit, the routing unit and the steering angle sensor and to which a storage unit is assigned, wherein the industrial truck is configured to perform a method of the type just described.

For this purpose, the control unit processes the data made available by the sensor unit, the routing unit and the steering angle sensor in the manner described above in conjunction with the method according to the invention in order to be able to correspondingly deal with obstacles ascertained in the surroundings of the industrial truck. In particular, the control unit can be operationally coupled or integrated with a central control unit, provided in any event, of such an industrial truck, wherein the central control unit furthermore controls, for example, further functions of the industrial truck and correspondingly can in any event already access certain sensor data.

The industrial truck according to the invention can furthermore comprise a notification unit which is operationally coupled to the control unit and which is configured to issue a warning to an operator of the industrial truck as the at least one predetermined measure and/or the control unit can furthermore be configured to instruct a control and/or brake intervention of the industrial truck as the at least one predetermined measure.

Moreover, the at least one sensor unit can be formed as a laser scanner which preferably detects a region of approximately 180° relative to the main locomotion direction of the industrial truck, in particular symmetrically in relation to this direction. Such laser scanners perform a corresponding detection of the surroundings in a periodic manner multiple times per second, wherein a multiple detection of an object can be used for validation or improvement in determining the position thereof. In such a case, the 180° opposite the main locomotion direction, in particular the region behind the front of the vehicle, should then correspondingly be regarded as a blind spot of such a sensor, in which increased safety from a collision with an obstacle is provided through the use of the method according to the invention.

However, other configurations of sensor units in industrial trucks according to the invention are also conceivable as long as they are able to perform detection of a lateral region of the industrial truck and supply data relating to the distance from detected objects to the industrial truck in the manner described above.

Further features and advantages of the present invention will become even clearer from the following description of one embodiment thereof if this is considered in conjunction with the enclosed figures.

In FIGS. 1A to 3D, in each case an industrial truck 10 is shown which is configured to carry out a method according to the invention. It should be noted in this case that some of the components discussed below of the industrial truck are only represented in FIGS. 1A and 1B on the grounds of clarity. The industrial truck 10 comprises in this case a vehicle body 12 with three wheels 14a to 14c provided thereon and a load handling device 16 in the form of a vertically displaceable load fork, wherein two wheels 14a and 14b are arranged in the region of the load handling device 16 and are not steerable, while furthermore the third wheel 14c is assigned to the vehicle body 12, which third wheel 14c is both steerable and also driven.

The industrial truck 10 furthermore comprises a sensor unit 18, for example, in the form of a laser scanner known per se which is provided at the front on the vehicle body 12 in the main direction of travel L and is configured to detect objects present in the surroundings of the industrial truck 10 in a range of approximately 180° and in particular also laterally in relation to the main locomotion direction L and determine their distances y thereof to the vehicle in the direction perpendicular to the main locomotion direction L. In this case, it should once again be pointed out that the term "laterally" should be understood at this point such that a lateral detection of objects is performed in such a manner that these are preferably detected in the region in front of the vehicle and are subsequently laterally passed when traveling straight ahead, i.e. do not collide with the vehicle when traveling straight ahead.

The industrial truck 10 furthermore comprises a routing unit 20 in the form of an odometry unit which can detect, for example, a number of wheel rotations of the steered and driven wheel 14c and convert them via the known circumference of the wheel 14c into a route covered, while a steering angle sensor 22 is likewise assigned to the steered wheel 14c and can identify the current steering angle thereof with respect to the main locomotion direction L. The industrial truck 10 furthermore comprises a control unit 24 which is operationally coupled to the at least one sensor unit 18, the routing unit 20 and the steering angle sensor 22 and is configured to perform the method described below and according to the invention on the basis of the data supplied by these units.

Figure 1B:
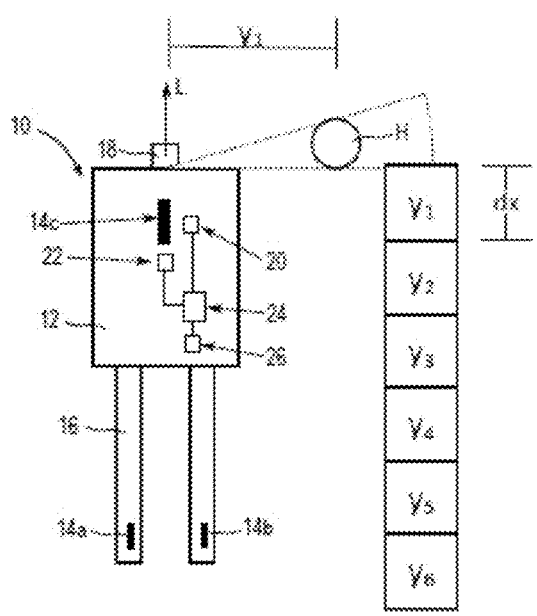

Here, a state is shown firstly in FIGS. 1A and 1B, in which state the industrial truck 10 comes closer to an obstacle H or travels laterally past it when traveling straight ahead along its main locomotion direction L. Here, the perpendicular distance y1 to the obstacle H is detected by the sensor unit 18 and stored in a suitable manner in a storage unit 26 assigned to the control unit 24. Here, it is indicated in FIGS. 1A and 1B that a division of the surroundings of the industrial truck 10 in relation to the locomotion direction into a multiplicity of portions dx is performed, in which in each case a presence of an obstacle or object can be detected, wherein either the stated distance y1 or a suitable symbol to represent an absence of an object can then be entered in the corresponding entry in the storage unit 26.

The storage unit 26 consequently acts at this point as a bucket-brigade or buffer, wherein an endless number of entries in the buffer are correspondingly present which can represent in each case obstacles and corresponding distances or their absence. It is provided in this case that as soon as the path traveled relative to a detected object or obstacle exceeds the length of the industrial truck 10, this object can be deleted from the storage unit 26 so that at all times only one region at the side of the industrial truck 10 is stored in terms of objects present therein in the storage unit 26 which corresponds to a length of the industrial truck 10. Corresponding buffers can of course likewise be provided in an identical manner for the opposite left-hand side of the vehicle.

In the case of the exemplary embodiment shown in FIGS. 1A and 1B, the length dx is selected in this case such that the corresponding side of the industrial truck is divided into six portions, the respective entries of which in the storage unit 26 can correspondingly include in each case a distance y1 to y6 or a symbol which represents an absence of a corresponding object. A significantly reduced storage requirement in comparison with corresponding methods known from the prior art is achieved in this manner.

Figure 2:
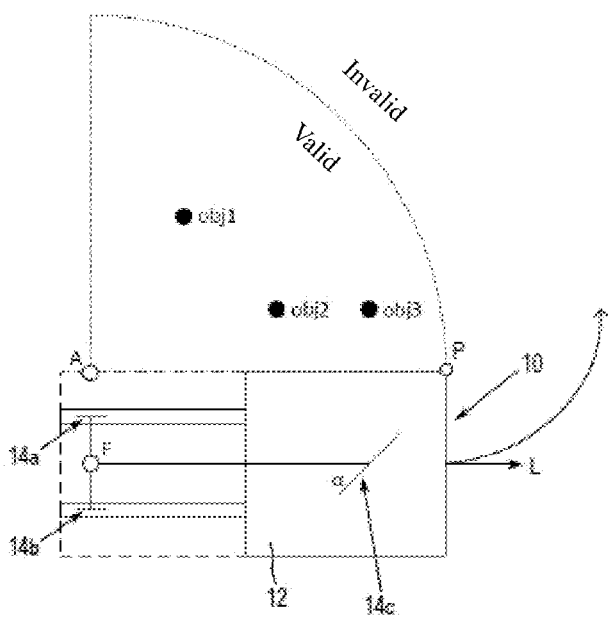
FIG. 2 shows a schematic view to illustrate a filtering of specific objects, according to some embodiments.

FIG. 2 thus indicates a method by means of which a filtering of the determined objects can be performed on the basis of geometric properties of the industrial truck 10, wherein a quarter circle has been constructed for the filtering on the corresponding side of the industrial truck 10, the center point of which quarter circle has been determined by a point of intersection A of an outer edge of the industrial truck 10 and a perpendicular projection to a point of rotation F of the industrial truck 10 constructed corresponding to the position of the wheels 14a to 14c, which point of rotation F lies in particular centrally between the two non-steered wheels 14a and 14b. A distance from the center point A to a front external point P of the industrial truck furthermore serves as the radius of this quarter circle. During filtering, only objects which lie within this quarter circle constructed in such a manner are considered in the further method steps, i.e. in this case objects obj1 to obj3.

Figure 3A:
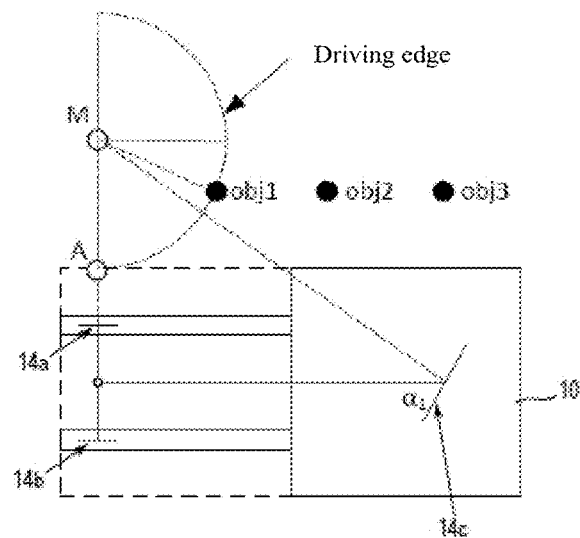
FIGS. 3A-D show respective views to determine a critical steering angle of an industrial truck, according to some embodiments.
Figure 3B:
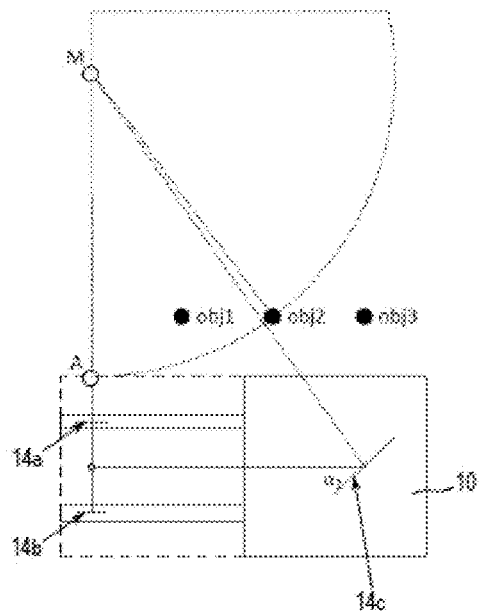
Figure 3C:
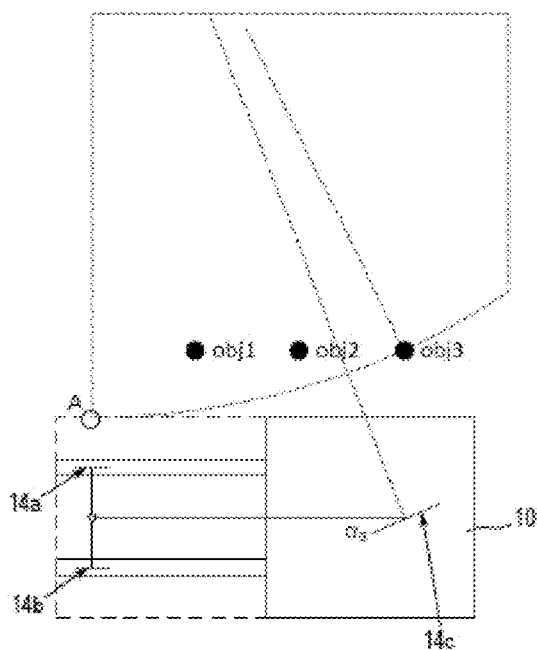
Figure 3D:
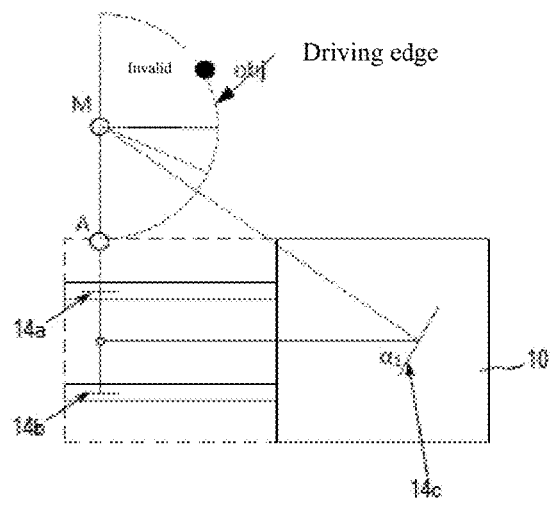

FIGS. 3A to 3C thus show three views to determine the respective admissible maximum steering angle to the three specific objects obj1 to obj3 on a corresponding side of the industrial truck 10, while FIG. 3D shows a case in which an object obj lies in an invalid region and can correspondingly be ignored. In this case, a driving edge which corresponds to a circular path in the event of cornering of the industrial truck 10 is constructed on the basis of a single-track movement model of the industrial truck 10.

The corresponding construction of this circular path is performed as a function of the above-mentioned point of intersection A of an outer edge of the industrial truck and a perpendicular projection to the point of rotation F for a derivation of the respective steering angle α1 to α3, wherein for this purpose a center point of the corresponding circular movement path is furthermore based on the corresponding steering angle α1 to α3.

If it emerges, as indicated in FIG. 3D, that a corresponding object obj lies in a half, facing away from the industrial truck 10, of the circle constructed in such a manner, the corresponding object is not taken into account. From the three steering angles α1 to α3 identified in this manner which are assigned in each case to one of the objects obj1 to obj3, the smallest admissible maximum steering angle α3 is determined as the critical steering angle on which the further method process is based.

Figure 4:
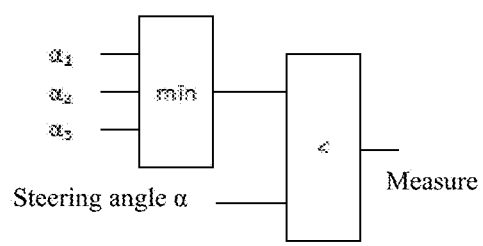
FIG. 4 shows a schematic diagram to illustrate processing of data recorded, according to some embodiments.

As now namely represented schematically in FIG. 4, the minimum is determined from the three stated admissible maximum steering angles α1 to α3 and compared with the current steering angle α of the vehicle 10 determined by the steering angle sensor 22. Should in this case the current steering angle α of the industrial truck 10 be greater than the critical steering angle α3, a predetermined measure is triggered in the case of the industrial truck 10, for example, a notification of the corresponding operator and/or a control and/or brake intervention in an automatic manner.

What is claimed is:

1. A method for dealing with obstacles in an industrial truck during a driving operation thereof, the method comprising:
    detecting surroundings of an industrial truck on at least one side perpendicular to a locomotion direction by means of at least one sensor unit which is configured to detect objects and determine respective lateral distances therefrom to the industrial truck when laterally passed by the industrial truck; and
    detecting a traveled path by means of a routing unit;
    upon detection of each object:
    storing the lateral distance of the object in a storage unit and at least one piece of information about a position or a position region of the object relative to the traveled path of the industrial truck;
    determining a respective admissible maximum steering angle to at least a part of the object and previously detected objects on the basis of their respective stored lateral distances and a predetermined movement model of the industrial truck;
    selecting a smallest of the admissible maximum steering angles as a critical steering angle; and
    comparing the critical steering angle with a current steering angle of the industrial truck which is determined by means of a steering angle sensor, and
    if the current steering angle of the industrial truck is larger than the critical steering angle, triggering at least one predetermined measure.

2. The method of claim 1, wherein the surroundings of the industrial truck on at least one side of the industrial truck is divided into a plurality of position regions, each position region comprising a predetermined length relative to the path traveled.

3. The method of claim 2, wherein, when several objects are detected within a single position region, only the lateral distance from the closest object in relation to the industrial truck is stored.

4. The method of claim 1, wherein when the path traveled relative to a specific object exceeds a length of the industrial truck, the specific object is deleted from the storage unit.

5. The method of claim 1, further comprising filtering the detected objects on the basis of geometrical properties of the industrial truck.

6. The method of claim 1, wherein a quarter circle is constructed for filtering the detected objects on a side of the industrial truck, wherein a center point of the quarter circle is determined by a point of intersection of an outer edge of the side of the industrial truck and a perpendicular projection to a point of rotation of the industrial truck, and wherein a distance from the center point to a front external point of the industrial truck serves as a radius.

7. The method of claim 1, wherein a single-track model is used as the predetermined movement model of the industrial truck.

8. The method of claim 1, wherein the triggering of the at least one predetermined measure comprises notifying an operator by means of a corresponding notification unit and/or a control and/or brake intervention of the industrial truck.

9. An industrial truck comprising:
    a vehicle body with at least three wheels provided thereon;
    a load handling device;
    at least one sensor unit which is configured to detect objects and determine respective lateral distances thereof to the industrial truck in a direction perpendicular to a main locomotion direction when laterally passed by the industrial truck;
    a routing unit;
    a steering angle sensor for detecting a traveled path of the industrial truck; and
    a control unit which is operationally coupled to the at least one sensor unit, the routing unit and the steering angle sensor and to which a storage unit is assigned,
    wherein, upon detection of each object, the control unit:
    stores the lateral distance of the object in the storage unit and at least one piece of information about a position or a position region of the object relative to the traveled path;
    determines a respective admissible maximum steering angle to at least a part of the object and previously detected objects on the basis of their respective stored lateral distances and a predetermined movement model of the industrial truck;
    selects a smallest of the admissible maximum steering angles as a critical steering angle; and
    compares the critical steering angle with a current steering angle of the industrial truck which is determined by means of a steering angle sensor, and
    if the current steering angle of the industrial truck is larger than the critical steering angle, triggers at least one predetermined measure.

10. The industrial truck of claim 9, further comprising a notification unit which is operationally coupled to the control unit and which is configured to issue a warning to an operator of the industrial truck as the at least one predetermined measure.

11. The industrial truck of claim 9, wherein the control unit is further configured to instruct a control and/or brake intervention of the industrial truck as the at least one predetermined measure.

12. The industrial truck of claim 9, wherein the at least one sensor unit is formed as a laser scanner.

13. The industrial truck of claim 12, wherein the laser scanner detects a region of approximately 180° relative to the main locomotion direction of the industrial truck.

14. The industrial truck of claim 9, wherein the lateral distance of the object and the at least one piece of information is stored in the storage unit if the position or the position region is in a blind spot of the industrial truck.

15. The method of claim 1, wherein the lateral distance of the object and the at least one piece of information is stored in the storage unit if the position or the position region is in a blind spot of the industrial truck.

16. The method of claim 1, wherein the surroundings of the industrial truck on both sides of the industrial truck are divided into a plurality of position regions, each position region comprising a predetermined length relative to the path traveled.

\* \* \* \* \*